(No Model.) 3 Sheets—Sheet 1.
J. R. TUCKER & C. C. HINCKLEY.
ELECTRIC METER.
No. 576,240. Patented Feb. 2, 1897.
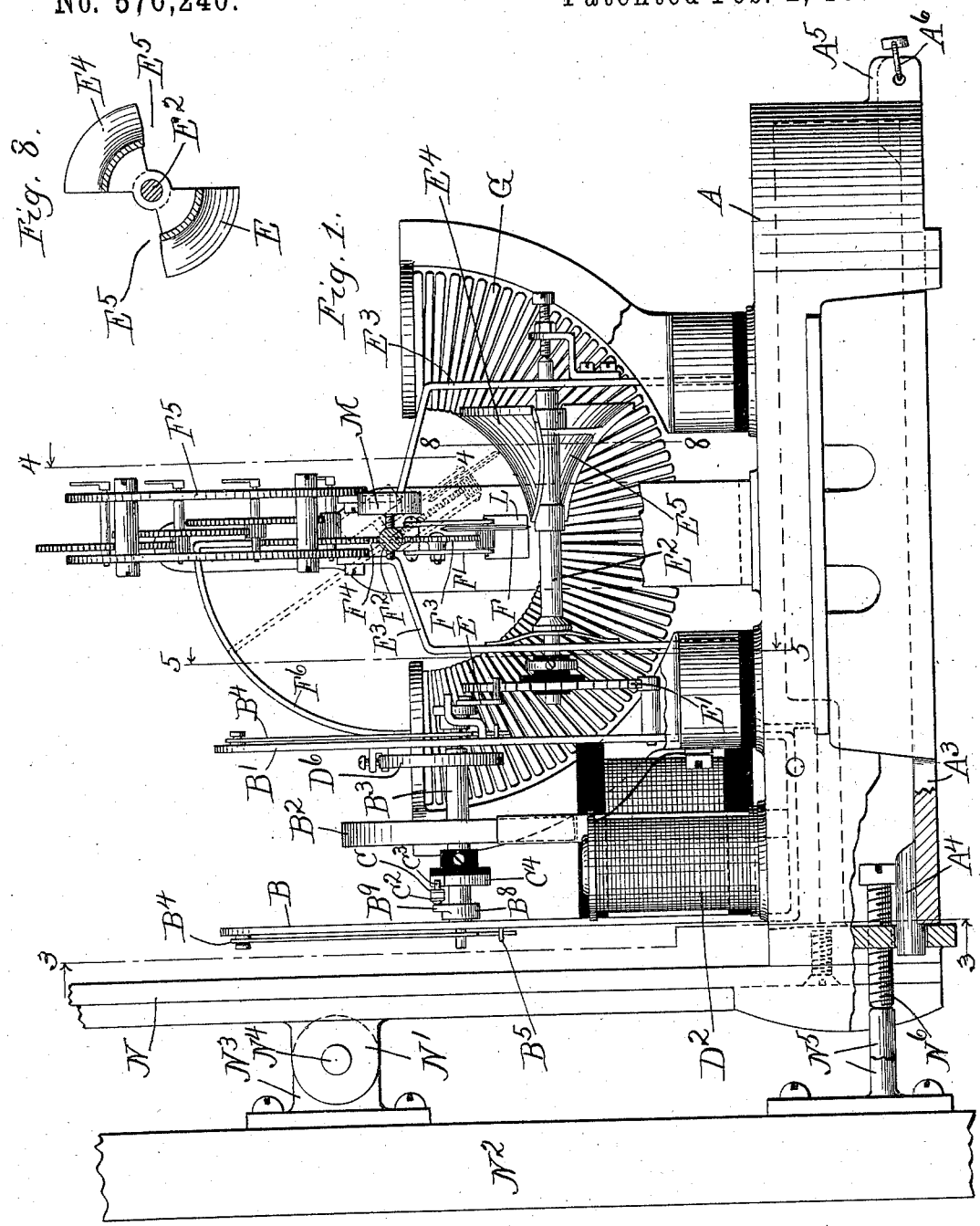
Witnesses.
E. T. Wray.
Donald M. Carter.
Inventors
John R. Tucker
Charles C. Hinckley
by Francis W. Parker,
Atty.

(No Model.) 3 Sheets—Sheet 2.
J. R. TUCKER & C. C. HINCKLEY.
ELECTRIC METER.
No. 576,240. Patented Feb. 2, 1897.
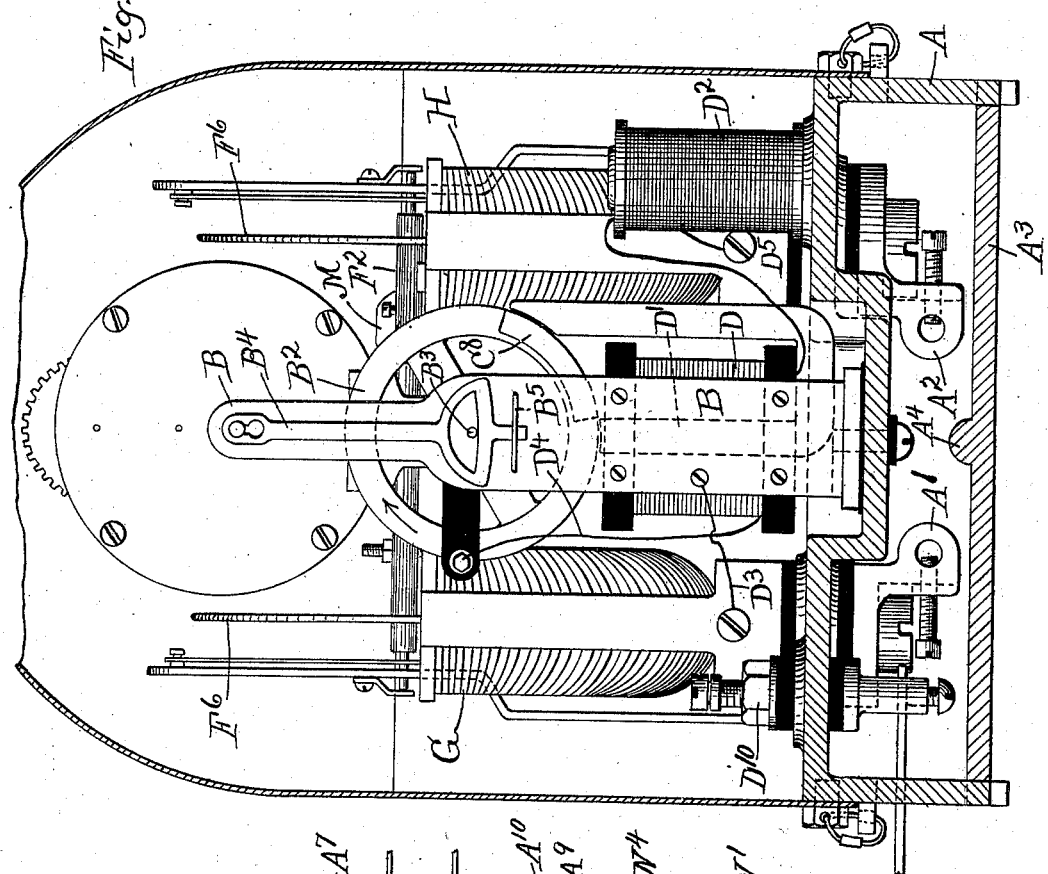
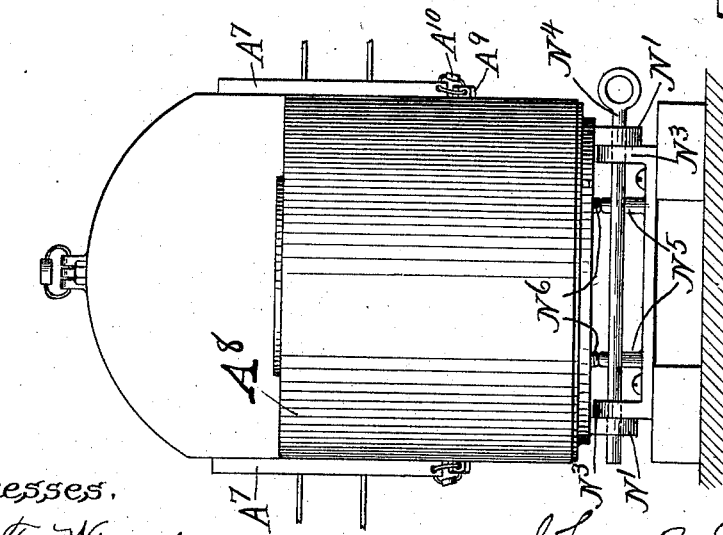

(No Model.) 3 Sheets—Sheet 3.
J. R. TUCKER & C. C. HINCKLEY.
ELECTRIC METER.
No. 576,240. Patented Feb. 2, 1897.
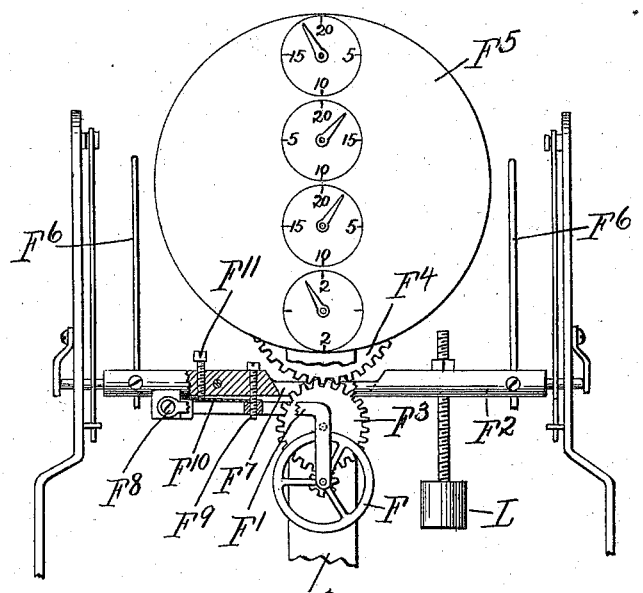
Fig. 4.
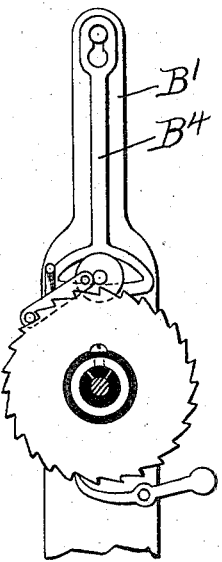
Fig. 5.
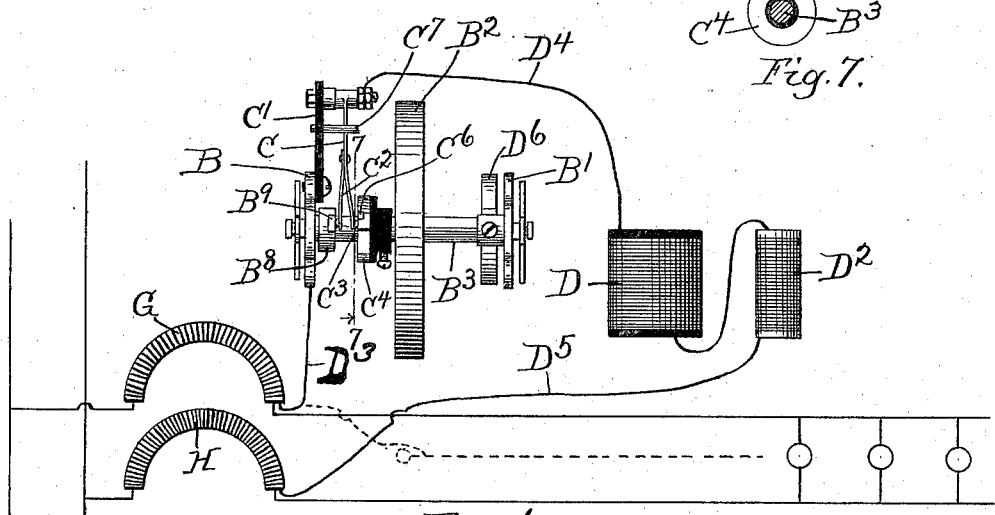
Fig. 7.
Fig. 6.
Witnesses.
E. T. Wray.
Donald M. Carter.
Inventors
John R. Tucker
Charles C. Hinckley
by Francis W. Parker, Atty.

UNITED STATES PATENT OFFICE.

JOHN R. TUCKER AND CHARLES C. HINCKLEY, OF AURORA, ILLINOIS.

ELECTRIC METER.

SPECIFICATION forming part of Letters Patent No. 576,240, dated February 2, 1897.

Application filed January 25, 1896. Serial No. 576,882. (No model.)

*To all whom it may concern:*

Be it known that we, JOHN R. TUCKER and CHARLES C. HINCKLEY, citizens of the United States, residing at Aurora, county of Kane, and State of Illinois, have invented certain new and useful Improvements in Electric Meters, of which the following is a description.

Our invention relates to electric meters or devices for measuring electric currents.

The object of our invention is to provide a simple, efficient, accurate, and reliable device for measuring electric currents.

Briefly stated, the meter, as illustrated, consists of a contact-surface having a planimeter-wheel opposed thereto, means for moving said surface, a registering device connected with said planimeter-wheel, and a connection between the planimeter-wheel and the circuit containing the current to be measured, by which the position of the planimeter-wheel is varied by variations in the current, the contact-surface so formed that the duration of contact made therewith by the planimeter-wheel varies with the different positions of said wheel due to the variation of the current to be measured. It is of course evident that the connections in this case might be reversed, if desired, that is, the planimeter-wheel might be connected with the motor and the bearing-surface with the registering device.

We have shown in detail in the drawings a meter embodying our invention. This meter has been thoroughly tested and has been proven to be satisfactory in every way, but we wish to be understood at the beginning as not limiting ourselves to the construction herein set out, as we have found that the meter may be constructed in many different ways, and, in fact, that it may be made so different as to appear totally unlike the meter herein shown, without in any manner departing from the spirit of our invention.

Our invention is illustrated in the accompanying drawings, wherein—

Figure 1 is a side view of the meter with the protecting-cover removed. Fig. 2 is a top view of the meter with the cover in position. Fig. 3 is a section on line 3 3, Fig. 1, with the cover in position. Fig. 4 is a section on line 4 4, Fig. 1, looking in the direction of the arrow, some of the parts being omitted. Fig. 5 is a section on line 5 5, Fig. 1, looking in the direction of the arrow, parts being omitted. Fig. 6 is a diagrammatic view showing the manner of connecting the meter in the circuit. Fig. 7 is a section on line 7 7, Fig. 6, with parts omitted. Fig. 8 is a section on line 8 8, Fig. 1.

Like letters refer to like parts throughout the several figures.

The several parts of the meter are supported upon the base A and are insulated therefrom. Connected with the base A and insulated therefrom are the standards or supports B B', preferably united at their base. A wheel $B^2$ is rotatably mounted between these standards, said wheel being connected with the shaft $B^3$, which is mounted in bearings in the said standards. The bearings in each end of the shaft are similar and are of a peculiar construction. Said shaft projects through enlarged openings in the standards and bears upon the stirrups $B^4$ $B^4$ which are pivoted near the top of the standards. The stirrups are provided at their lower ends with projections which work back of the guides $B^5$. This construction allows the shaft to be rotated with very little friction. A collar $B^8$ is rigidly connected with the shaft $B^3$ and is preferably provided with an electrical contact-point $B^9$. An arm C, pivotally connected to the support C', of insulating material, connected to the standard B, is provided with a spring-contact $C^2$, (see Fig. 6,) adapted to make contact at intervals with the contact $B^9$. This spring-contact is preferably of platinum or is provided with a platinum point at the point of contact.

The arm C is provided at its end with a pin $C^3$, which bears upon a disk $C^4$ or other supporting device. Said disk is cut away at $C^5$ and is provided with a groove $C^6$, communicating with said cut-away portion. When the parts are at rest and in their normal position, the pin $C^3$ is in the position shown in full lines in Fig. 7. The disk $C^4$ is insulated from the shaft $B^3$ and simply acts as a guide for the pin $C^3$, its object being to control the position of the contact $C^2$, so that it may only come in contact with the opposed contact $B^9$ at predetermined intervals. A pin $C^7$ limits the upward motion of the arm C. The wheel $B^2$ is a balance-wheel, preferably of non-magnetic material, and has connected with its rim a piece $C^8$, of magnetic material.

Placed beneath the balance-wheel is a magnet D, having a core $D'$, which is substantially in the shape of a horseshoe, as shown, both ends of said core being in proximity to the rim of the balance-wheel. When the parts are at rest and in their normal position, the magnetic material $C^8$ on the rim of the balance-wheel is substantially in the position shown in Fig. 3, and the balance-wheel is operated by making and breaking the circuit through the magnet.

A resistance-coil $D^2$ is preferably placed in series with the magnet D, so that the magnet may be made of any desired strength. Said magnet is connected across the terminals of the meter in any desirable manner. As herein shown, the supports $B$ $B'$ are electrically connected to one branch of the circuit by the wire $D^3$. The arm C is connected by wire $D^4$ with magnet D, said magnet being connected with the resistance-coil $D^2$ and also being connected by wire $D^5$ with the other branch of the circuit. (See Fig. 6.)

When the meter is used upon a three-wire system, the wire $D^3$ is disconnected from the solenoid G and is connected with the third wire, as shown in dotted lines in Fig. 6. This is accomplished in the meter by connecting the wire $D^3$ with the binding-post $D^{10}$. (See Fig. 3.) The balance-wheel is moved in one direction by the magnet D and in the other direction by the coil-spring $D^6$, connected at one end to the shaft $B^3$ and at the other end to the standard $B'$. Pivotally connected to the end of the shaft $B^3$ or enlargement thereon is a pawl E, adapted to engage the teeth on the ratchet-wheel $E'$. Said pawl is eccentrically connected with the shaft, so as to be given a reciprocating motion when the shaft is rocked. Said ratchet-wheel is rigidly connected with the shaft $E^2$, supported in bearings on the standards $E^3$ $E^3$ and is insulated therefrom. A cone-shaped or bell-shaped contact surface or piece $E^4$ is rigidly connected with said shaft and is slotted or cut away at the points $E^5$. The bell-shaped piece $E^4$ is so constructed that the planimeter-wheel F, which swings about a center, will engage its surface in all its different positions. The wheel F (see Fig. 4) is rotatably mounted in a frame $F'$, connected with the shaft $F^2$. The frame $F'$ has connected therewith the pinion $F^3$, engaging a pinion on the shaft of the wheel F. The pinion $F^3$ engages a pinion $F^4$, connected with the mechanism of the registering device $F^5$. This registering device may be of any suitable description and will need no further description.

Rigidly connected to the shaft $F^2$ are the arms or loops $F^6$, the ends of which are inserted in the coils or solenoids G H, connected in the circuit to be measured. These cores are of magnetic material and their position will be varied as the current flowing through the solenoids varies. The shaft $F^2$ is therefore moved by the current flowing through said solenoids so as to bring the wheel F in contact with the bell-shaped piece $E^4$, as shown in dotted lines in Fig. 1. As herein shown, the shaft $F^2$ is provided with a slot $F^7$, passing through its axis, and the pinions $F^3$ and $F^4$ project into this slot, engaging each other substantially at the axis of the shaft. It will be seen that by this construction the relation of the pitched lines of the two pinions at the point where they engage each other remains substantially the same during all the different positions of the pinion $F^3$ and the two pinions will always be in engagement, and the friction due to this engagement will be substantially constant at all times.

The frame $F'$ is pivotally connected to the shaft $F^2$ at $F^8$ and is held in position by the screw $F^9$, which passes loosely through the shaft $F^2$. A screw $F^{11}$ passes through the screw-threaded opening in the shaft $F^2$ and bears against a spring $F^{10}$, connected with the frame $F'$. By this construction the wheel F may be forced against the surface of the bell-shaped piece $E^4$ with any desired pressure. A regulable weight L is connected with the shaft $F^2$ in such a manner as to counteract the force exerted by the solenoids upon the cores $F^6$. A second regulable weight M is attached to the shaft $F^2$ at one side thereof, so as to counterbalance the weight of the cores $F^6$ $F^6$.

The base A to which the mechanism of the meter is attached is hollowed out beneath, the terminals $A'$ $A^2$ of the coils or solenoids G and H being located in this hollow portion. A plate $A^3$ fits beneath the base and is adapted to be sealed, so that unauthorized persons cannot tamper with the connections to the meter. This plate may be constructed in any desirable form. As herein shown, it is provided at one end with the projecting lug $A^4$ and at the other end with a second projection adapted to fit between the lugs $A^5$ on the base A, the plate being held in place by a sealing device $A^6$, passing through holes in the lugs. Connected to the back of the meter is the frame N, provided with the projecting lugs $N'$. A frame $N^2$ is connected to the wall or other device upon which the meter is supported and is provided with lugs $N^3$, the meter being held in place by means of a pin $N^4$, passing through holes in the lugs, as shown in Fig. 2. The frame $N^2$ is provided at its lower end with the projections $N^5$, and the base of the meter is provided with the screws $N^6$, adapted to engage the projections $N^5$, the purpose being to permit the leveling of the meter.

When the meter is leveled up by means of these screws and the plate $A^3$ sealed in position, the meter cannot be put out of level, so as to prevent it from working satisfactorily. The base A is also provided with the leveling projections $A^7$, upon which leveling instruments may be placed, so as to indicate when the meter is in the correct position. A cover $A^8$ is placed over the meter and is connected thereto in any convenient manner, as by screws $A^9$, the parts so constructed that the seals $A^{10}$ may be passed through the screws and thus prevent the meter from being tampered with by unauthorized persons.

We have shown the motor device in the meter as being operated by electricity, but of course it is evident that a mechanical motor or an electrical motor of any other description may be used, if desired.

The use and operation of our invention are as follows: When the meter is in position and unconnected with the circuit, the parts are in the position shown in Figs. 1, 3, and 6. If now the meter is connected in circuit, the current to be measured passes through the solenoids G and H and also through the magnet D, energizing the same. The circuit through said magnet will be traced as follows, (see Fig. 6:) through the solenoid H to resistance $D^2$, thence to magnet D, thence by wire $D^4$ to arm C, thence through contact $C^2$ to contact $B^9$, sleeve $B^8$ to the shaft $B^3$, thence by wire $D^3$ to the solenoid G. When the magnet D is energized, it attracts the magnetic material fastened to the rim of the fly-wheel and causes the said fly-wheel to rotate in the direction of the arrow, Fig. 3. As the wheel rotates it moves the shaft therewith and the contact $B^9$ is moved away from the contact $C^2$, so as to break the circuit. During this movement the pin $C^3$ on the arm C passes through the groove $C^6$ in the disk $C^4$ and then engages the periphery of said disk. When the fly-wheel is moved a certain distance in this direction, it is stopped and moved in the opposite direction by means of the coil-spring $D^6$. When moved in this latter direction, the pin $C^3$ does not move back through the slot $C^6$, but passes it on the periphery of the disk $C^4$ and drops down into the cut-away part $C^5$, and hence the contact $C^2$ does not come in contact with the contact $B^9$. When the fly-wheel has reached the limit of its motion in this direction, it starts back in the opposite direction in order to reach a balanced position, and the pin $C^3$ enters the slot $C^5$ and brings the contact $C^2$ in contact with contact $B^9$, thus again completing the circuit and causing the wheel to be given a new impetus by the magnet. The slot $C^6$ is so shaped that when the pin $C^3$ is passing therethrough the contact $C^2$ and the end of the arm C are brought closely together, so as to form a spring-contact between the contact-arm and the contact-point $B^9$. When said pin is released from the slot, the two parts spread apart, so that the pin will pass the slot on the periphery of the disk. It will thus be seen that the current only flows through the motor-magnet a very short period of time during each cycle or oscillation of the balance-wheel. The movement of the balance-wheel is conveyed to the shaft $E^2$ and bearing-surface $E^4$ by means of the pawl E and ratchet-wheel $E'$. When no current is flowing through the solenoids of the meter, the planimeter-wheel F is in the position shown in full lines in Fig. 1. If now the circuit is completed through these solenoids by cutting in translating devices, for example, in current to be measured, the cores $F^6$ are drawn therein and the planimeter-wheel F and the parts connected therewith are moved so as to bring it into contact with the bearing-surface $E^4$, as shown in dotted lines in Fig. 1. This position varies as the current to be measured varies, and the bearing-surface $E^4$ is so shaped that the amount the planimeter-wheel is rotated by contact therewith varies with the different positions of the planimeter-wheel, being increased by an increase in the current.

We have found that when the bearing-surface is constructed as herein shown it is necessary to cut away part of the surface of the bell-shaped piece in order to get satisfactory results. These cut-away portions also allow the planimeter-wheel to be moved to a position corresponding to the strength of the current passing through the solenoids, as it is free from engagement with the bearing-surface at these points. The planimeter-wheel is connected in any convenient manner with a suitable registering device. The balance-wheel is operated continuously and the registering device is only operated when the planimeter-wheel is in contact with the bearing-surface, that is, when there is a current flowing through the solenoids of the meter.

It will be seen that we have here an exceedingly simple device for measuring electric currents.

The cam or bell-shaped piece $E^4$, it will be noticed, is provided with a curved non-continuous surface. It will also be noticed that the edges of the surface of this cam are substantially perpendicular to the line of motion of the planimeter-wheel, so that said planimeter-wheel makes contact with the cam without its position being affected by the contact or by the disengagement therefrom.

We claim—

1. An electric meter comprising a movable contact-surface, a motor for operating the same, a planimeter-wheel adapted to engage said contact-surface, said planimeter-wheel connected with a movable frame adapted to be moved about an axis, a pinion connected with said planimeter-wheel so as to be operated thereby, a registering mechanism provided with a second pinion adapted to engage said first-mentioned pinion at a point substantially at the axis of rotation of said movable frame, and a connecting device between said movable frame and a device responsive to the current to be measured, said connecting device so constructed that the position of the frame is varied by the variation of the current.

2. An electric meter comprising a movable non-continuous curved contact-surface, a motor for operating same, the curve of said surface being substantially the arc of a circle, a planimeter-wheel adapted to bear upon said surface and connected with a movable support, said support adapted to be rotated about an axis, so that the periphery of said planimeter-wheel is free to move laterally in the arc of a circle, a registering mechanism connected with said planimeter-wheel so as be operated by said wheel in all its various positions, and a connection between said planimeter-wheel and a device responsive to the current to be measured, said connecting device so constructed that the position of the planimeter-wheel is varied by the variation of the current, said contact-surface divided into parts separated by spaces, so that said planimeter-wheel is freed therefrom at intervals in order that it may assume a position corresponding to the strength of the current in the circuit, the planimeter-wheel driven over the contact-surface, and the contact-surface curved so that the line of travel in which the planimeter-wheel strikes the edge of the surface is substantially always at right angles to the line of such edge.

3. An electric meter comprising a movable non-continuous curved contact-surface, varying in width from one end toward the other, a motor for operating same, a planimeter-wheel adapted to engage said contact-surface and connected with a movable frame adapted to be rotated or rocked about an axis, a regulating device associated with said frame whereby the pressure exerted between said planimeter-wheel and said contact-surface may be regulated, a connecting device connecting said planimeter-wheel with a device responsive to the current to be measured, said connecting device so constructed that the position of the planimeter-wheel varies with the current, and a registering device connected with said planimeter-wheel so as to be operated thereby.

4. An electric meter comprising a balance-wheel, a circuit making and breaking device associated with said balance-wheel so as to be operated thereby, an electromagnet connected with said circuit making and breaking device, and to a source of electrical supply, said electromagnet associated with said balance-wheel so as to act upon it and move it when the magnet is energized, a spring or the like associated with said balance-wheel so as to act against said electromagnet, a contact-surface connected with said balance-wheel so as to be moved thereby, a planimeter-wheel adapted to engage said contact-surface and connected with a device responsive to the current so that its position is varied with the variation of the current, and a registering device connected with said planimeter-wheel so as to be operated thereby, the planimeter-wheel driven over the contact-surface, and the contact-surface curved so that the line of travel in which the planimeter-wheel strikes the edge of the surface is substantially always at right angles to the line of such edge.

5. An electric meter comprising a balance-wheel made of non-magnetic material, but having a piece of magnetic material connected therewith, a circuit making and breaking device associated with said balance-wheel so as to be operated thereby, an electromagnet connected in circuit with said circuit making and breaking device and to a source of electrical supply, said magnet associated with said balance-wheel so as to act upon said magnetic material connected therewith when said magnet is energized and move said wheel, a spring or the like associated with said balance-wheel so as to act against said electromagnet, a contact-surface connected with said balance-wheel so as to be moved thereby, a planimeter-wheel adapted to engage said contact-surface and connected with a device responsive to the current so that its position is varied with the variation of the current, and a registering device connected with said planimeter-wheel so as to be operated thereby, the planimeter-wheel driven over the contact-surface, and the contact-surface curved so that the line of travel in which the planimeter-wheel strikes the edge of the surface is substantially always at right angles to the line of such edge.

6. An electric meter comprising a movable non-continuous curved contact-surface, a motor for moving the same, a planimeter-wheel adapted to be brought into contact with said surface, one or more pieces of magnetic material associated with said planimeter-wheel and acting as cores for one or more solenoids in the circuit carrying the current to be measured, the parts so constructed that the position of the planimeter-wheel is varied by the variation of the current flowing through said solenoid or solenoids, and a registering mechanism connected with said planimeter-wheel so as to be operated thereby, the planimeter-wheel driven over the contact-surface, and the contact-surface curved so that the line of travel in which the planimeter-wheel strikes the edge of the surface is substantially always at right angles to the line of such edge.

7. An electric meter comprising a movable contact-surface, a motor for operating same, a planimeter-wheel adapted to engage said contact-surface, said planimeter-wheel connected with a movable frame adapted to be moved about an axis, a pinion connected with said planimeter-wheel so as to be operated thereby, a registering mechanism provided with a second pinion at a point substantially at the axis of rotation of said movable frame, one or more solenoids connected in the circuit carrying the current to be measured, the core or cores of said solenoid or solenoids connected with said movable frame so as to vary its position as the current in the circuit to be measured varies.

8. An electric meter comprising a movable contact-surface, a motor for operating same, a planimeter-wheel adapted to engage said contact-surface, said planimeter-wheel connected with a movable frame adapted to be moved about an axis, a pinion connected with said planimeter-wheel so as to be operated thereby, a registering mechanism provided with a second pinion at a point substantially at the axis of rotation of said movable frame, one or more solenoids connected in the circuit carrying the current to be measured, the core or cores of said solenoid or solenoids connected with said movable frame so as to vary its position as the current in the circuit to be measured varies, and a regulable weight associated with said movable frame and adapted to counteract the force of the solenoid or solenoids as the position of the core or cores of said solenoid or solenoids is varied.

9. An electric meter comprising a movable contact-surface, a motor for operating same, a planimeter-wheel adapted to engage said contact-surface, said planimeter-wheel connected with a movable frame adapted to be moved about an axis, a pinion connected with said planimeter-wheel so as to be operated thereby, a registering mechanism provided with a second pinion at a point substantially at the axis of rotation of said movable frame, one or more solenoids connected in the circuit carrying the current to be measured, the core or cores of said solenoid or solenoids connected with said movable frame so as to vary its position as the current in the circuit to be measured varies, a regulable weight associated with said movable frame and adapted to counteract the force of the solenoid or solenoids as the position of the core or cores of said solenoid or solenoids is varied, and a second regulable weight associated with said frame so as to counteract the weight of the core or cores of said solenoid or solenoids.

10. An electric meter comprising a balance-wheel of non-magnetic material, with a piece of magnetic material connected with the frame thereof, a circuit making and breaking device associated therewith so as to be operated thereby, an electromagnet connected in circuit with said circuit making and breaking device and to a source of electrical supply, said magnet so associated with said balance-wheel that when the parts are in their normal position, the circuit is completed through the said electromagnet, so as to cause it to act upon the magnetic part of said balance-wheel and move the same, a spring associated with said balance-wheel and adapted to act against said electromagnet, the whole so constructed that the balance-wheel is oscillated back and forth, a shaft associated with said balance-wheel so as to be continuously rotated in one direction, a curved contact-surface connected with said shaft, a planimeter-wheel adapted to engage said contact-surface, a connection between said planimeter-wheel and a device responsive to the current to be measured, said connection being such that the relative position of said planimeter-wheel and said contact-surface varies with the current, and a registering device connected with said planimeter-wheel so as to be operated thereby, the planimeter-wheel driven over the contact-surface, and the contact-surface curved so that the line of travel in which the planimeter-wheel strikes the edge of the surface is substantially always at right angles to the line of such edge.

11. An electric meter comprising a balance-wheel of non-magnetic material, with a piece of magnetic material connected with the frame thereof, a circuit making and breaking device associated therewith so as to be operated thereby, an electromagnet connected in circuit with said circuit making and breaking device and to a source of electrical supply, said magnet so associated with said balance-wheel that when the parts are in their normal position, the circuit is completed through said electromagnet so as to cause it to act upon the magnetic part of said balance-wheel and move the same, a spring associated with said balance-wheel and adapted to act against said electromagnet, the whole so constructed that the balance-wheel is oscillated back and forth, a shaft associated with said balance-wheel so as to be continuously rotated in one direction, a curved contact-surface connected with said shaft, a planimeter-wheel adapted to engage said contact-surface, a connection between said planimeter-wheel and the circuit carrying the current to be measured, said connection being such that the relative position of said planimeter-wheel and said contact-surface varies with the current, and a registering device connected with said planimeter-wheel so as to be operated thereby, said contact-surface consisting of parts separated by spaces, so that said planimeter-wheel is freed therefrom at predetermined intervals, the planimeter-wheel driven over the contact-surface, and the contact-surface curved so that the line of travel in which the planimeter-wheel strikes the edge of the surface is substantially always at right angles to the line of such edge.

12. An electric meter comprising a balance-wheel of non-magnetic material, with a piece of magnetic material connected with the frame thereof, a circuit making and breaking device associated therewith, so as to be operated thereby, an electromagnet connected in circuit with said circuit making and breaking device and to a source of electrical supply, said magnet so associated with said balance-wheel that when the parts are in their normal position, the circuit is completed through the said electromagnet, so as to cause it to act upon the magnetic part of said balance-wheel and move the same, a spring associated with said balance-wheel and adapted to act against said electromagnet, the whole so constructed that the balance-wheel is oscillated back and forth, a shaft associated with said balance-wheel so as to be continuously rotated in one direction, a curved contact-surface connected with said shaft, a planimeter-wheel adapted to engage said contact-surface and connected with a movable frame adapted to be moved about an axis, a registering device connected with said planimeter-wheel so as to be operated thereby, one or more solenoids connected in the circuit carrying the current to be measured, said solenoid or solenoids provided with a core or cores connected with said movable frame so as to vary its position when the current in the solenoid or solenoids is varied, the planimeter-wheel driven over the contact-surface, and the contact-surface curved so that the line of travel in which the planimeter-wheel strikes the edge of the surface is substantially always at right angles to the line of such edge.

13. An electric meter comprising a balance-wheel of non-magnetic material, with a piece of magnetic material connected with the frame thereof, a circuit making and breaking device associated therewith so as to be operated thereby, an electromagnet connected in circuit with said circuit making and breaking device and to a source of electrical supply, said magnet so associated with said balance-wheel that when the parts are in their normal position, the circuit is completed through the said electromagnet, so as to cause it to act upon the magnetic part of said balance-wheel and move the same, a spring associated with said balance-wheel and adapted to act against said electromagnet, the whole so constructed that the balance-wheel is oscillated back and forth, a shaft associated with said balance-wheel so as to be continuously rotated in one direction, a curved contact-surface connected with said shaft, a planimeter-wheel adapted to engage said contact-surface and connected with a movable frame, a pinion operatively connected with said planimeter-wheel, a rotatable shaft to which said frame is connected, a pinion operatively connected with said planimeter-wheel, a registering device provided with a pinion adapted to engage said first-mentioned pinion, the shaft carrying the movable frame being cut away so that said pinions engage each other substantially at the axis of the shaft, one or more solenoids connected in the circuit carrying the current to be measured and provided with movable cores, said cores being connected with said shaft so as to move the same when the current passing through the solenoids is varied.

14. An electric meter comprising a balance-wheel of non-magnetic material, having a piece of magnetic material connected therewith, rigidly connected with a rotatable shaft, a contact-point associated with said shaft and electrically connected with one branch of an electric circuit, a spring-contact carried by an arm and supported in proximity with said first-mentioned contact and adapted to engage it at predetermined intervals when the balance-wheel is oscillated, an electromagnet connected with said spring-contact and with a source of electrical supply, the core of said electromagnet normally in proximity to the magnetic part of said balance-wheel, the balance-wheel and contacts so arranged that the circuit is completed through said contacts when the balance-wheel is at rest, and is broken by the movement of the balance-wheel, a spring associated with said balance-wheel and adapted to act in opposition to said electromagnet, a shaft provided with a ratchet-wheel, a pawl associated with said balance-wheel and adapted to engage said ratchet-wheel so as to rotate same, a contact-surface connected with said shaft so as to be rotated by the same, a planimeter-wheel adapted to engage said contact-surface, a connection between said planimeter-wheel and a device responsive to the current to be measured, said connection being such that the position of the planimeter-wheel upon said surface is varied as the current varies, and a registering device connected with said planimeter-wheel so as to be operated thereby, the planimeter-wheel driven over the contact-surface, and the contact-surface curved so that the line of travel in which the planimeter-wheel strikes the edge of the surface is substantially always at right angles to the line of such edge.

15. An electric meter comprising a balance-wheel of non-magnetic material, having a piece of magnetic material connected therewith, rigidly connected with a rotatable shaft, a contact-point associated with said shaft, and electrically connected with one branch of an electric circuit, a spring-contact carried by an arm and supported in proximity with said first-mentioned contact and adapted to engage it at predetermined intervals when the balance-wheel is oscillated, an electromagnet connected with said spring-contact and with a source of electrical supply, the core of said electromagnet normally in proximity to the magnetic part of said balance-wheel, the balance-wheel and contacts so arranged that the circuit is completed through said contacts when the balance-wheel is at rest, and is broken by the movement of the balance-wheel, a guiding device for the frame carrying the spring-contact, said guiding device so constructed that the spring-contact is only connected with its associated contact once during each complete oscillation of the balance-wheel.

16. The combination with an electric meter of a base upon which it is supported, having an upwardly-projecting part connected therewith, a frame adapted to be permanently connected with a wall or other support, said frame adapted to be removably connected with the upwardly-projecting part associated with the meter, one or more leveling instruments associated with the base of said meter and adapted to bear against said frame so as to control the position of the meter substantially as described.

17. The combination with an electric meter of a base upon which the same is supported, said base hollowed out to receive the terminals of the meter, a frame adapted to be permanently connected with a wall or other support and adapted to be removably connected with said meter-frame, one or more leveling-screws connected with the meter-frame so that the ends by which they are controlled project within the hollow part thereof, said leveling-screws adapted to bear against said frame, and a base-plate adapted to be connected with said frame so as to completely inclose the terminals and leveling-screws.

18. A balance-wheel for operating a train of mechanism, comprising a wheel rotatably mounted upon a supporting device, a contact-point associated with said wheel so as to move therewith, a spring-contact arm connected with a supporting device and adapted to make contact with said contact-point at certain predetermined times, said spring-contact having an arm connected thereto, a guide for said arm associated with said wheel so as to move therewith, said contact-point and spring-contact being connected with an electric circuit, an electromagnet also connected with said circuit and associated with said wheel so as to oscillate the same, and a spring connected with said wheel so as to act against said magnet, the whole so arranged that the electric circuit is alternately broken and completed.

19. A balance-wheel for operating a train of mechanism, comprising a wheel rotatably mounted upon a supporting device, a contact-point associated with said wheel so as to move therewith, a spring-contact arm connected with a supporting device and adapted to make contact with said contact-point at certain predetermined times, said spring-contact having an arm connected thereto, a guide for said arm consisting of a disk connected with said wheel so as to be moved thereby, said disk being provided with a groove in its side, a projection on said arm adapted to pass along said groove when said disk is moving in one direction, the disk being constructed so that the projection will move along the periphery of the disk when said disk is moving in the opposite direction, said contact-point and spring-contact being connected with an electric circuit, an electromagnet also connected with said circuit and associated with said wheel so as to oscillate the same, and a spring connected with said wheel so as to act against said magnet, the whole so arranged that the electric circuit is alternately broken and completed.

20. A balance-wheel for operating a train of mechanism, comprising a wheel rotatably mounted upon a supporting device, said balance-wheel composed of non-magnetic material and provided on its periphery with a piece of magnetic material, a contact-point associated with said wheel so as to move therewith, a spring-contact arm connected with a supporting device and adapted to make contact with said contact-point at certain predetermined times, said spring-contact having an arm connected thereto, a guide for said arm associated with said wheel so as to move therewith, said contact-point and spring-contact being connected with an electric circuit, an electromagnet also connected with said circuit and provided with a core normally opposed to said magnetic portion of the wheel, and a spring connected with said wheel so as to act against said magnet, the whole so arranged that the electric circuit is alternately broken and completed.

21. An electric meter comprising an interrupted curved movable contact-surface, a motor to drive the same, a planimeter-wheel rotating upon such interrupted surface so as to reach the line of interruption always substantially at right angles thereto, a register connected with so as to be driven by such planimeter-wheel, and a device actuated by the current to be measured and adapted to vary the position of the wheel on the surface.

22. An electric meter comprising an interrupted curved, movable contact-surface, a motor to drive the same, a planimeter-wheel rotating upon such interrupted surface, and always striking the interruption-line substantially at right angles a support for the same, so that the point of contact of the wheel with the surface is always equally distant from the pivotal point of such support, a register connected with so as to be driven by such planimeter-wheel, and a device actuated by the current to be measured and adapted to vary the position of the wheel on the surface.

23. An electric meter comprising an interrupted, curved, movable contact-surface, bell-shaped on its exterior surface, a motor to drive the same, a planimeter-wheel rotating upon such interrupted surface so as to reach the line of interruption always substantially at right angles thereto, a register connected with so as to be driven by such planimeter-wheel, and a device actuated by the current to be measured and adapted to vary the position of the wheel on the surface.

JOHN R. TUCKER.
CHARLES C. HINCKLEY.

Witnesses:
DONALD M. CARTER,
E. T. WRAY.